Nov. 1, 1949.  W. D. TIPTON  2,486,690
HYDRAULIC UNIT
Filed Jan. 18, 1945  2 Sheets-Sheet 1
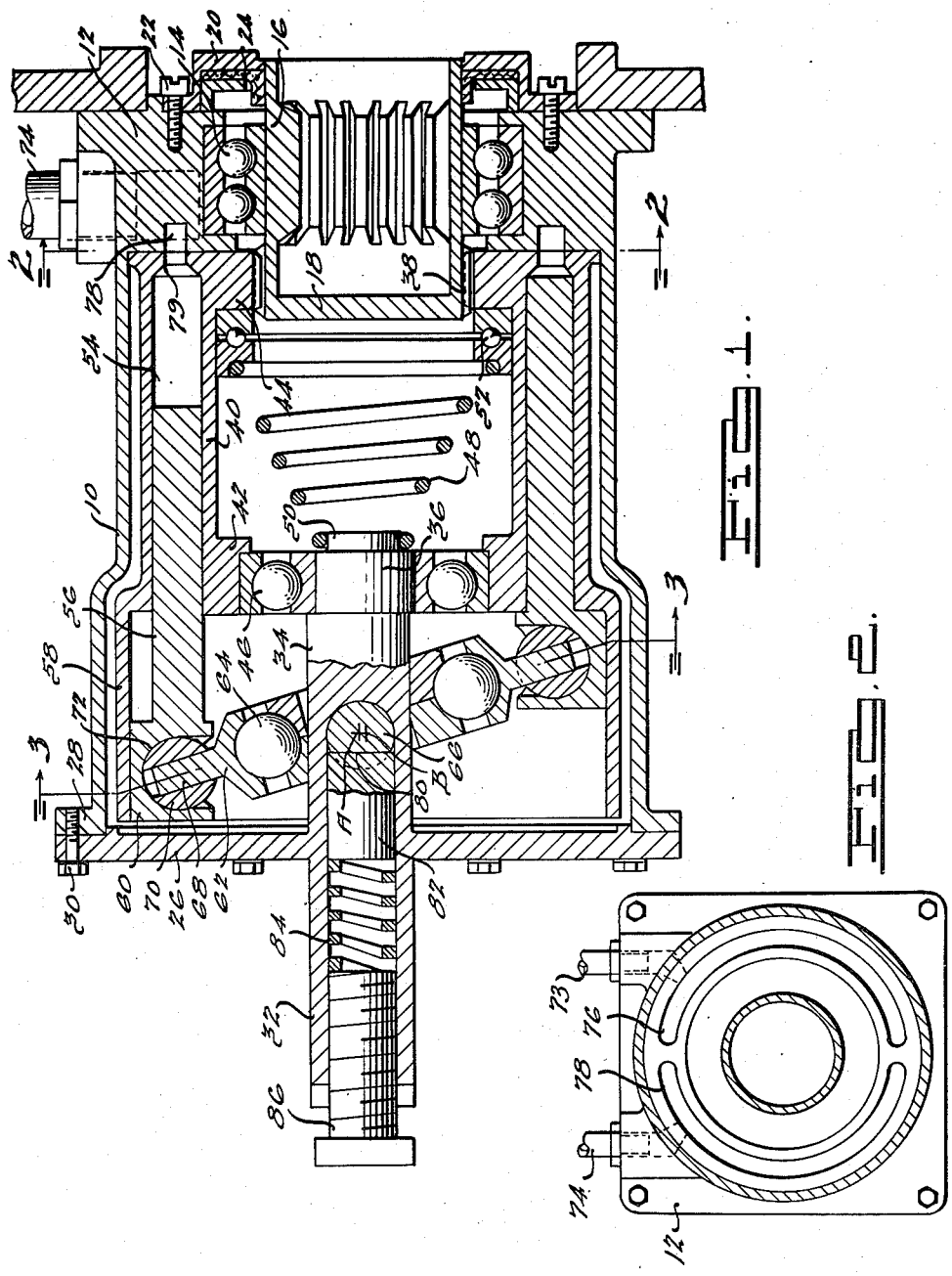
INVENTOR.
William D. Tipton.
BY
Maxwell K. Murphy
ATTORNEY.

Nov. 1, 1949.   W. D. TIPTON   2,486,690
HYDRAULIC UNIT

Filed Jan. 18, 1945   2 Sheets-Sheet 2

INVENTOR.
William D. Tipton.
BY
Maxwell K. Murphy
ATTORNEY.

Patented Nov. 1, 1949

2,486,690

UNITED STATES PATENT OFFICE 2,486,690

HYDRAULIC UNIT

William D. Tipton, Stoneleigh, Md.; Elizabeth Barrett Tipton executrix of said William D. Tipton, deceased Application January 18, 1945, Serial No. 573,447

3 Claims. (Cl. 103—162)

This invention relates to a hydraulic unit and more especially to a unit which may be used as a hydraulic pump or a hydraulic motor.

An object of the invention is to provide a mechanism which may be used as a constant volume pump, a constant pressure pump or a hydraulic motor.

A further object of the invention is to provide automatic means, which may be adjustable, for predetermining the amount of fluid pressure delivered by the pump when it is used as a constant pressure pump.

Another object of the invention is to provide a device of the aforesaid type which is easily and inexpensively manufactured and one in which the efficiency and operation is greatly improved.

Other objects and advantages of the invention will more fully appear from the following description taken in connection with the accompanying drawings in which:

Fig. 1 is a longitudinal sectional view through the improved unit;

Fig. 2 is a sectional view taken on line 2—2 of Fig. 1 and shown on reduced scale;

Figure 3:
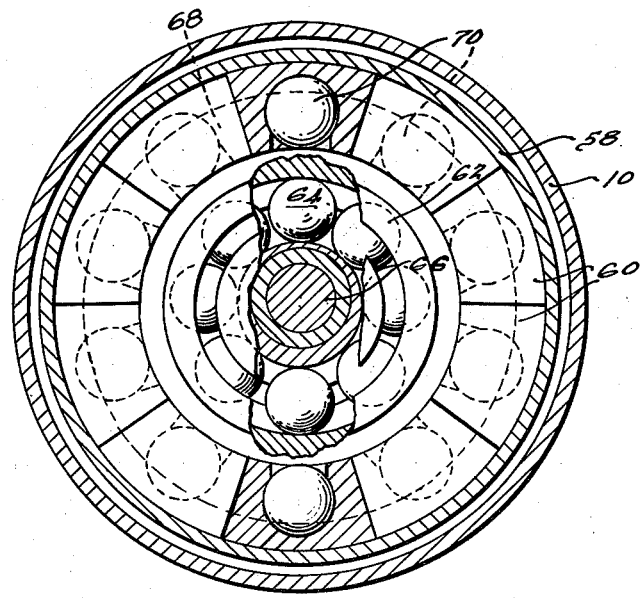
Fig. 3 is a sectional view taken on line 3—3 of Fig. 1.
Figure 4:
Fig. 4 is a view illustrating a modified form of plunger to be replaced for the plunger shown in Fig. 1.

Referring to the drawings, a casing 10 has an apertured end wall 12 which receives a bearing 14. An internally splined sleeve 16 is received in the bearing 14 and has an inner closed end 18. The end wall 12 receives a cap 20 which is detachably secured thereto by screws 22 and is provided with a sealing member 24 which fits the outer periphery of the sleeve 16 to form a fluid tight connection at the end of the casing. The opposite end of the casing is provided with a closure member 26 which is detachably secured to a radially extending flange 28 on the end of the casing 10, by bolts 30. The closure member 28 has an outwardly projecting sleeve portion 32 and an inwardly projecting pintle 34. The sleeve 32 and pintle 34 are eccentrically mounted relative to the axis of the casing 10 and sleeve 16. At the inner end of the pintle 34 there is provided an extension 36 which is mounted concentrically to the axis of the casing 10 and sleeve 18.

Inwardly of the bearing 14 and formed on the outer periphery of the sleeve 16 are splines 38 which fit correspondingly formed splines on the inner periphery of the housing 40. The housing 40 is formed cylindrical and at its opposite ends there are provided radially extending flanges 42 and 44, the flange 44 carrying the splines and the flange 42 receiving a bearing 46. The bearing 44 is fitted on an extension 36 of the pintle 34, said extension being concentric with bearing 96. Thus, the housing 40 is rotatably supported between the bearings 14 and 46 through the splined connection 38.

The inner face of the end wall 12 receives the end face of the housing 40, the latter being held into engagement therewith by a compression spring 48. One end of the compression spring 48 is supported on a guide portion 50 of the extension 36 and the opposite end of the spring 48 abuts a thrust bearing 52 which abuts the inner wall of the radially extending flange 44. This spring pressure urges the adjacent end faces of the housing 40 and end wall 12 into sealing engagement.

The housing 40 is provided with a plurality of circumferentially spaced bores 54 which receive reciprocating pistons 56. A cylindrical sleeve 58 forms an extension from one end of the housing 40 and radially supports the enlarged portion 60 on the outer end of the pistons 56. The enlarged portions 60 have faces which bear against each other as illustrated in Fig. 3 and the outer periphery thereof conforms to the circumference of the inner periphery of the sleeve 58 so that the outer ends of the pistons 56 are supported radially by the sleeve 58.

A rotatable wobble plate 62 is mounted on a bearing member 64 which is pivotally supported on the pintle 34 so that it can swing from a position as shown on the drawing to a position at right angles to the axis of the pintle 34. A shaft 66 extending transversely through the shaft 34 forms the pivotal axis for the bearing 64 and its axis is mounted on a point designated at A above the axis of the bearings 46 and 14, a distance indicated by the distance between A, the axis of the pintle 34, and B, the axis of the rotatable housing 40. The wobble plate 62 is provided with a flange 68 which slidably receives spherical segments 70 fitted in correspondingly shaped recesses 72 in the enlarged portions 60 of the pistons 56.

As the sleeve 16 is rotated by a driving member engaging the internal splines of the sleeve 16, the housing 40 is rotated carrying with it the pistons 56 and the wobble plate 62. It will be understood that as the housing and pistons are rotated about the tilted plane of the wobble plate, the pistons are reciprocated in the bores 54.

Referring more particularly to Fig. 2, the end wall 12 is provided with an outlet passage 73 and an inlet passage 74. Circumferential grooves 76 and 78 are formed in the end face of the end wall 12 and have communication respectively with the outlet passage 73 and inlet passage 74.

It will be noted that the diameter of the bores 54 is larger than the width of the grooves 76 and 78 and that the outlet passages of the bores 54 have a reduced diameter as shown at 79 corresponding to the width of the grooves 76 and 78. By this arrangement, the pressure in the bores 54, on the outlet stroke of the pistons 56, force the face of the housing into sealing relation with the inner face of the end wall 12.

A portion of the shaft 66 is cut away as at 80, forming a flat spot to receive the end of a plunger 82 which is slidably mounted in the sleeve 32. A compression spring 84 is spaced between the outer end of the plunger 82 and the inner end of an adjusting screw 86, the latter being screw threaded into the sleeve 32. The compression spring 84 normally retains the shaft 66, in the position shown on the drawing, retaining the wobble plate 62 in the tilted position as indicated in Fig. 1. It will be noted that since the axis of the shaft 66 is above the axis of the rotatable housing 40 the pumping action of the pistons 56 within the bores 54 cause a greater pressure at the lower side of the wobble plate 62 than is created above the axis of the shaft 66. As the pressure through the outlet passage 73 is increased, there is an opposite pressure upon the lower segment of the wobble plate. As the pressure at the outlet passage 73 rises above a predetermined pressure, the excess pressure causes the wobble plate 62 to approach a line perpendicular to the axis of the housing 40 against the compression spring 84. The pressure on the spring 84 is determined by the adjustment of the axial position of the screw 86.

If it is desired to use the device as a constant volume pump, the spring 84 and plunger 82 are removed and a solid bar 88 is substituted therefor. This bar is held in position by the end of the screw 86 and prevents rotation of the shaft 66, thereby maintaining a full delivery stroke of the pistons and consequently a given volume regardless of pressure at the outlet passage 73.

If it is desired to operate the device as a motor, a fluid pressure may be applied through the inlet passage 74 causing the pistons to be forced against the wobble plate 62 thereby rotating the housing 40. The fluid pressure is then exhausted through the outlet passage 73.

It will be understood that various changes including the size, shape and arrangement of parts may be made without departing from the spirit of my invention and it is not my intention to limit its scope other than by the terms of the appended claims.

I claim:

1. An improved fluid power unit adapted for use as a pump or motor, comprising a casing; a rotatable housing disposed within the casing; a plurality of cylinders circumferentially arranged in said housing; pistons in said cylinders adapted for reciprocation therein; a pintle mounted in one end of said casing, said pintle being eccentrically disposed axially of said casing and having an integral extension disposed axially of said casing, means rotatably mounting said housing on said extension; a wobble plate mounted on said pintle and operatively connected with said pistons; and means disposed concentrically with said pintle for yieldably maintaining said wobble plate on a slant relatively to said pintle.

2. In a device as set forth in claim 1, means for rotatably mounting said wobble plate on said pintle comprising a shaft having a flat peripheral portion; a plunger in engagement with said flat portion of said shaft, and yieldable means engaged with said plunger and operable to urge said wobble plate into non-perpendicular relation with said pintle.

3. In a device as set forth in claim 2 wherein the yieldable means engaged with the plunger is provided with manually adjustable means for varying the pressure thereof on said plunger.

WILLIAM D. TIPTON.

REFERENCES CITED

The following references are of record in the file of this patent:

UNITED STATES PATENTS

| Number | Name | Date |
| --- | --- | --- |
| 1,794,575 | Borletti | Mar. 3, 1931 |
| 1,924,738 | Flanders | Aug. 29, 1933 |
| 2,129,828 | Dunn | Sept. 13, 1938 |
| 2,229,715 | Zimmermann | Jan. 23, 1941 |
| 2,292,125 | Ifield | Aug. 4, 1942 |
| 2,299,233 | Hoffer | Oct. 20, 1942 |
| 2,299,235 | Snader et al. | Oct. 20, 1942 |
| 2,303,955 | Rose | Dec. 1, 1942 |

FOREIGN PATENTS

| Number | Country | Date |
| --- | --- | --- |
| 500,937 | Great Britain | Feb. 16, 1939 |